A. B. SPIES.
Harrows.
No. 153,225. Patented July 21, 1874.
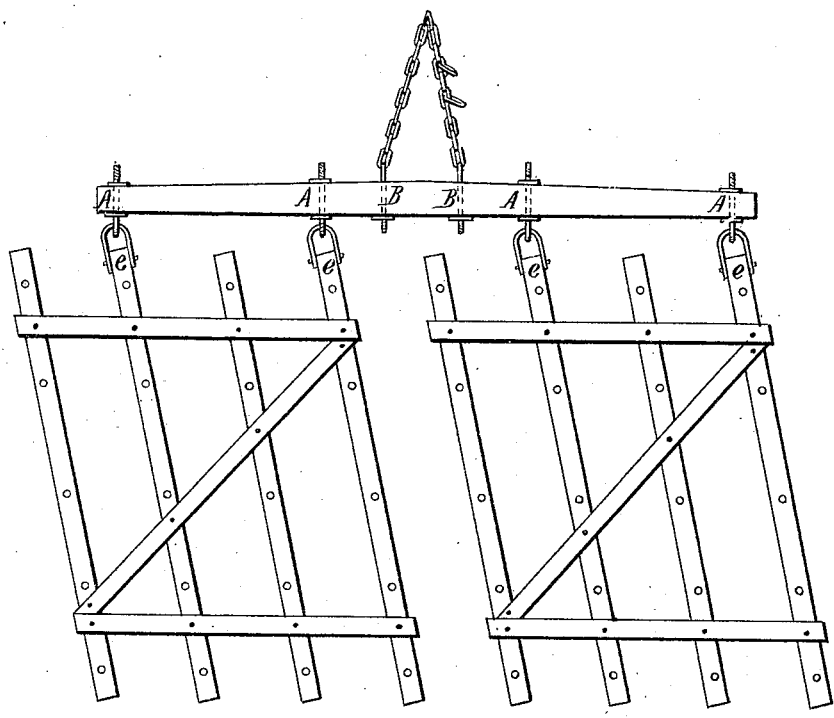
Witnesses.
John Piow.
H. C. Ward.
Inventor.
Adam B. Spies.

UNITED STATES PATENT OFFICE.

ADAM B. SPIES, OF STERLING, ILLINOIS.

IMPROVEMENT IN HARROWS.

Specification forming part of Letters Patent No. 153,225, dated July 21, 1874; application filed April 21, 1873.

*To all whom it may concern:*

Be it known that I, ADAM B. SPIES, of Sterling, in the county of Whitesides and State of Illinois, have invented certain Improvements in Harvesters, of which the following is a specification:

My invention relates to the attaching of the ordinary draw-bar to a harrow, made in two or more sections, so that each section may be raised independently of the other or others, and so that each section may preserve its relative position to the other section or sections without the intervention or use of hinges, hooks, chains, or any other connecting device between the sections.

The drawing represents a top view of a machine embodying my invention.

The draw-bar is furnished with the four eye-bolts A A A A, passed horizontally through such draw-bar from the rear, at about the intervals shown in the drawing. Through these eyes respectively are passed the clevises e e e e, which clevises are attached severally to the front end of the beams of the harrow, one pair to each section, as shown. The eyes of the bolts are placed perpendicular, and the clevises horizontal. This permits each section of the harrow to be raised from the rear, for the purpose of cleansing from accumulated rubbish without interfering with the other section or sections. Also, each section having two nearly rigid front bearings, the relative positions of the sections laterally is secured without any devices connecting the sections—that is, the sections can neither approach toward nor recede from each other.

The advantage of dispensing with all devices for connecting the sections to each other must be palpable. As the rubbish invariably collects near the front part of the sections, the latter must be lifted, in some instances, to more than an angle of forty-five degrees with the ground, to allow such rubbish to disengage itself and pass out. This cannot be done when the section has side connections, without partially raising one or more of the other sections—an operation which is not only laborious, but which disturbs or suspends the working of such other section or sections. Any front connection which permits the sections to have the least side motion will necessarily require connections between the sections, to compel the latter to keep their relative positions; and it is only by making the attachment of the sections to the draw-bar rigid as to any side oscillation, that such inter-section couplings can be dispensed with.

In turning around, it is impossible for one section to get over or under the other, as all the sections are kept in a line with the draw-bar. The clevises are fitted into the eyes sufficiently loose to allow of the necessary lateral jarring or shaking of the harrow. And the attachment to the draw-bar permitting vertical motion at each clevis by the turning of the clevis on its pin, each section of the harrow adjusts itself to the inequalities of the ground. The draw-bar is made proportionate in length to the width and number of the sections.

I make no claim to the harrow generally, as to the shape or number of the sections, or the structure of the sections; nor do I claim the draw-bar, for I am aware that these are not new; but

I claim as my invention—

The eyebolts A A A A, and the clevises e e e e, in combination, one pair of each to each section of the harrow, and in combination with the sections and draw-bar, substantially in the manner and for the purpose specified.

ADAM B. SPIES.

Witnesses:
F. O. HEADLEY,
ED. BOWMAN.